United States Patent

Schmidt et al.

[11] Patent Number: 6,019,831
[45] Date of Patent: Feb. 1, 2000

[54] NON-LUSTROUS PIGMENTS

[75] Inventors: Christoph Schmidt, Frankfurt; Claudia Seibel, Otzberg; Margarete Herbski, Ober-Ramstadt; Ralf Emmert; Klaus Ambrosius, both of Dieburg, all of Germany

[73] Assignee: Merck Patent Gesellschaft Mit Beschrankter Haftung, Germany

[21] Appl. No.: 08/795,979

[22] Filed: Feb. 5, 1997

Related U.S. Application Data

[63] Continuation-in-part of application No. 08/575,547, Dec. 20, 1995, abandoned, and application No. 08/346,242, Nov. 23, 1994, abandoned.

[30]  Foreign Application Priority Data

Nov. 25, 1993 [DE] Germany .............................. 43 40 146
Dec. 21, 1994 [DE] Germany .............................. 44 45 394

[51] Int. Cl.⁷ .............................. C09C 3/04; C08K 13/06
[52] U.S. Cl. .......................... 106/417; 106/415; 106/418; 106/456; 106/457; 106/446; 428/363; 428/402; 428/403; 428/404

[58] Field of Search ..................................... 106/415, 417, 106/456, 457, 418, 446; 428/363, 402, 403, 404

[56] References Cited

U.S. PATENT DOCUMENTS

| | | | |
|---|---|---|---|
| 2,620,261 | 12/1952 | Toxby ..................................... | 106/456 |
| 4,435,220 | 3/1984 | Watanabe et al. ...................... | 106/417 |
| 4,544,415 | 10/1985 | Franz et al. ............................. | 106/417 |
| 4,755,229 | 7/1988 | Armanini ................................ | 106/417 |
| 4,810,305 | 3/1989 | Brown et al. ........................... | 106/456 |
| 5,407,746 | 4/1995 | Prengel et al. ......................... | 428/403 |

FOREIGN PATENT DOCUMENTS

| 4441223 | 6/1995 | Germany . |
|---|---|---|
| 63-159476 | 7/1988 | Japan . |

*Primary Examiner*—C. Melissa Koslow
*Attorney, Agent, or Firm*—Millen, White, Zelano & Branigan, P.C.

[57]  ABSTRACT

The present invention relates to non-lustrous iron oxide-containing color pigments based on dry-milled inorganic plateletlike substrates having a particle size of <60 $\mu$m, characterized in that the iron oxide compound is yellow FeO(OH) and/or $Fe_2O_3$.

29 Claims, 1 Drawing Sheet

NON-LUSTROUS PIGMENTS

This application is a continuation-in-part of both application Ser. No. 08/575,547, filed Dec. 20, 1995, now abandoned, and application Ser. No. 08/346,242, filed Nov. 23, 1994, now abandoned.

BACKGROUND OF THE INVENTION

The invention relates to non-glossy pigments having improved properties.

Traditional absorption pigments, such as, for example titanium oxide or iron oxide usually consist of very small parties having a size of typically 0.1–1 μm, which absorb and/or strongly scatter specific wavelengths or wavelength regions of the incident light, the color effect being due to the remaining components of the incident light.

Such pigments have high hiding power, and their optical properties can be influenced by the average particle size. In general, as the average particle size decreases, an increase in color purity and color strength is observed.

However, these advantages with respect to their optical properties are accompanied by several serious disadvantages in terms of practical application. In general, pigments of very fine particle size exhibit unsatisfactory dispersibility which deteriorates further with decreasing particle size. This may be due to the strong tendency of very fine particles to form agglomerates, which can only be eliminated with large expenditures of energy and time and with the use of special dispersing apparatuses.

This tendency to form agglomerates reduces the color quality in a pigment formulation and simultaneously increases the amount of pigment required for achieving a specific color saturation in the pigment formulation, again adversely affecting the viscosity of the formulation.

Accordingly, the application of traditional nonglossy pigments is governed by the following rule of thumb: the higher the optical quality of these pigments, the more difficult and more expensive the processability (see G. D. Parfitt, Dispersion of powders in liquids, Elsevier Science Publishing Co., New York 1986).

In addition, traditional absorption pigments show high oil absorption in formulations and are distinguished by poor skin feeling.

Unlike traditional non-glossy pigments, pearl luster pigments are based on platelet-shaped substrates, in particular those made of mica, which are covered with one or more layers of one or more metal oxides, these platelet-shaped substrates having average diameters of typically 15–200 μm. Owing to the smooth surfaces and the higher average particle diameter, these pigments have a substantially improved processability in formulations. The optical properties are characterized by high gloss and low biding power, which may be due to the transparent or semi-transparent substrate material.

Pigments combining the properties of traditional pigments (high color purity, no gloss) with good processability of pigments having larger particle sizes have already been proposed in the literature. Thus, for example, EP 0 406 657 proposes to deposit individual pigment particles in the submicron region instead of uniform, compact metal oxide coatings on mica substrates. The pigments thus obtained, which are also designated as transparent colors, do not exhibit any gloss, unlike pearl luster pigments, due to increased light scattering on the submicron pigment particles, but are characterized, like the latter, by low hiding power.

Accordingly, there was a great need for non-glossy pigments which are distinguished by advantageous optical properties and, in particular, high color intensity and high hiding power and by good processability and good skin feeling.

SUMMARY OF THE INVENTION

One object of the present invention is to provide new pigments meeting the above-stated requirement profile to a large extent. Further objects of the present invention can be found by one skilled in the art in the following detailed description of the invention.

The present invention relates to non glossy pigments of high color intensity and high hiding power which are obtainable by dry-milling of platelet-shaped inorganic substrates, followed by classifying and applying one or more layers each of which contains one or more sparingly soluble, strongly adhering inorganic or organic colorants. The invention also relates to processes for preparing these pigments and to the use of the pigments in plastics, paints and coatings, printing formulations and cosmetic preparations.

Mica is an example of a naturally occurring inorganic platelet-shaped material. Mica is also used for preparing conventional pearl luster pigments. Preparation of pearl luster pigments is effected by processing the mica by wet milling and subsequent air separation usually in such a manner that a plurality of fractions having different particle size distribution are obtained.

Figure 1:
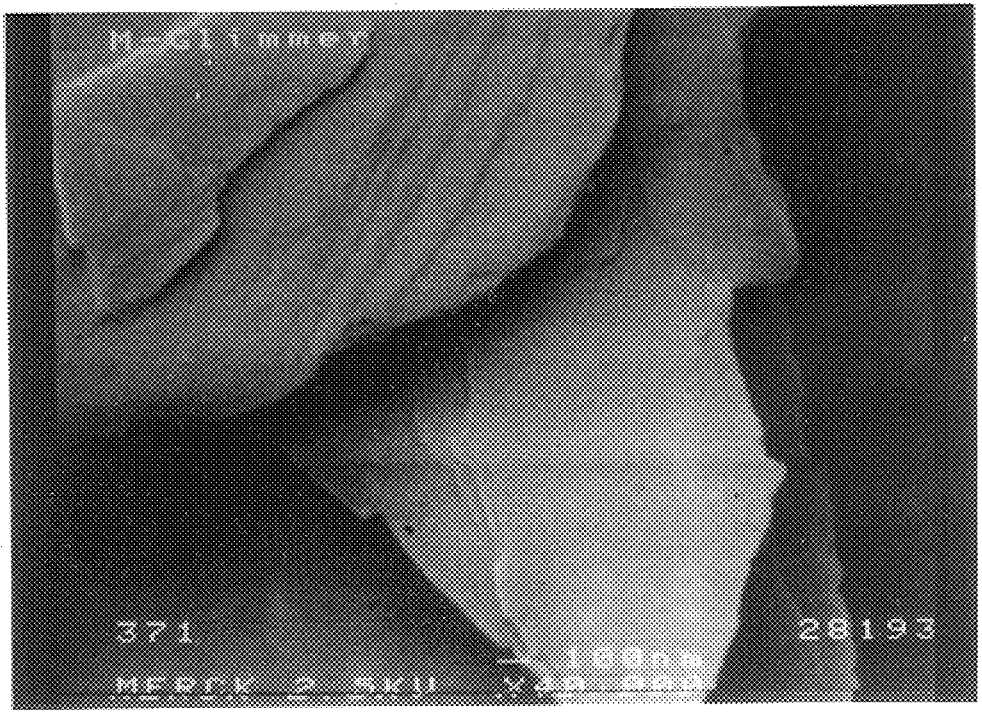
FIG. 1 shows an REM photograph of a wet-milled mica.

In wet milling, a moist paste of the inorganic platelet-shaped substrate material and, for example, water and/or organic solvents is, for example, ground between surfaces moving with respect to one another. This comminutes the substrate particles mainly by shearing while essentially maintaining the original platelet form. FIG. 1 shows an REM photograph of wet-milled mica having a particle size of <15 μm.

Maintaining the platelet structure has the effect that the pearl luster pigment obtained by coating wet-milled mica with metal oxide layers are characterized by a distinct gloss even if the <15 μm fraction is used as the substrate. Thus, for example, mica having a particle size of <15 μm coated in Comparative Experiment 1 with iron oxide possesses relatively high gloss.

It has now surprisingly been found that dry-milled inorganic platelet-shaped substrate particles have substantially lost their original platelet form and no gloss is to be observed in pigments prepared therefrom. Thus, for example, dry-milling of muscovite mica in a ball mill gives a white powder which essentially consists of irregularly shaped particles and has no gloss.

Figure 2:
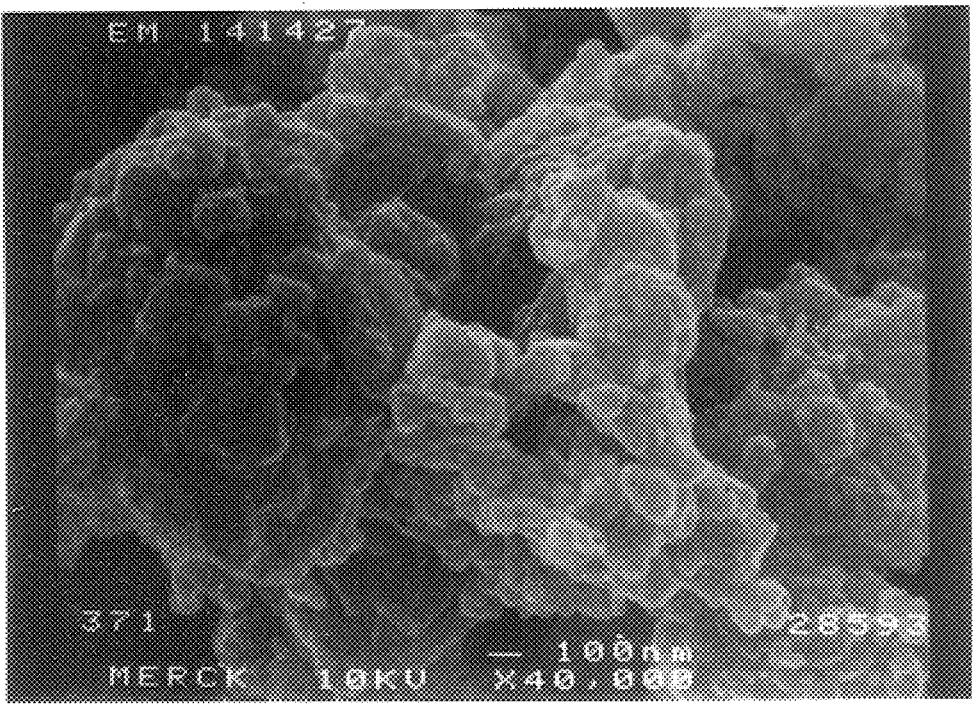
FIG. 2 shows an REM photograph of a mica dry-milled in accordance with the invention.

FIG. 2 shows an REM photograph of dry-milled muscovite mica. Compared with the REM photograph of wet-milled mica having a particle size of <15 μm in FIG. 1 it can be seen that the individual particles of the dry-milled mica (particle size between 1 and 22 μm) no longer have any smooth surfaces which would impart gloss to the resulting pigment, since substrate particles adhere to the surface.

FIG. 2 furthermore shows that although on the one hand the individual particles of the dry-milled mica have largely lost their platelet-shaped structure, a certain platelet-shaped or 2-dimensional long-range order is on the other hand maintained to a greater or lesser degree in the dry-milled substrate material. Conversely, it was found that the particles which are obtained in the dry-milling of non-platelet-shaped, 3-dimensional, regularly or irregularly shaped inorganic substrates have a different, three-dimensionally chaotic structure with no indication whatsoever of the 2-dimensional long-range order found in dry-milled platelet-shaped substrates.

The particularly preferred properties of the pigments according to the invention, which are distinguished by excellent optical properties, in particular by high color intensity and high hiding power, and simultaneously by good processability, are due to the particular properties of the substrate material used for their preparation, which material is obtained by dry-milling inorganic platelet-shaped material.

In a preferred dry-milling method, the mica is introduced into a stirred ball mill and continuously comminuted by means of a grinding medium made, for example, of corundum. The milling conditions are selected such that the structure described of the dry-milled substrate material is retained. It has been found that the selection of the milling conditions is not very critical and that it can be optimized for a given milling arrangement by one skilled in the art in an easy manner and without any inventive activity. Essentially, all that is required is to take care that with a given milling arrangement the milling time and the power input selected are not so extensive that any 2-dimensional long-range order is destroyed.

As used in the present invention, such excessive milling is not understood to mean dry-milling. Dry-milling as used in the present invention means that the milling conditions during milling of inorganic platelet-shaped substrates in the dry-milling arrangement used in each case are selected such that the individual particles of the milled substrate material are virtually no longer in platelet form, while the material still exhibits a certain, more or less pronounced 2-dimensional long-range order.

The dry-milling method described is merely given by way of example, it also being possible to use other dry-milling methods.

The dry-milled substrate material is then classified. Classification preferably takes place by air separation.

The dry-milled substrate particles are preferably classified to give a $d_{95}$ cut of less than 50 $\mu$m and preferably of less than 35 $\mu$m; $d_{95}$ indicates the diameter under which 95% of the particles in a fraction remain. Particular preference is given to dry-milled inorganic particles having a $d_{95}$ of <20 $\mu$m. Very particular preference is given to fractions of dry-milled inorganic particles in which 95% of the particles have a size between 0.1 and 30 $\mu$m and in particular between 0.2 and 20 $\mu$m.

The inorganic platelet-shaped substrates used are particularly preferably sheet silicates and very particularly preferably mica. Preferred sheet silicates are talc, kaolin or sericite, while the micas which are particularly preferably used are muscovite, biotite, phlogopite, vermiculite and also synthetic micas. Apart from them, other inorganic platelet-shaped materials, such as, for example, glass platelets, $SiO_2$ flakes, synthetic flakes, ceramic flakes, bismuth oxychloride, platelet-shaped barium sulfate, platelet-shaped alumina or MIO (micaceous iron oxide) and also further materials may also be used. These can be either naturally occurring materials or synthetic materials.

The geometric dimensions of the platelet-shaped substrates used are not critical. Thus, for example, relatively large natural mica particles having an average diameter of, for example, up to 2 cm or more may be used, but substantially smaller platelet-shaped particles having an average diameter of 50 $\mu$m or less can also be used. One skilled in the art can modify and optimize the dry-milling conditions (for example, size and amount of the grinding medium, power input, and the like) with regard to the platelet-shaped materials used without any inventive activity.

The list of inorganic platelet-shaped materials is only given by way of example, it also being possible to use other materials. They can range from more or less transparent to opaque.

Very particular preference is given to mica.

Platelet-shaped inorganic substrates other than mica also gave, after dry-milling, materials whose structure essentially corresponds to the structure of dry-milled mica described above, i.e., essentially non-platelet-shaped individual particles with one more or less pronounced 2-dimensional long-range order.

It has now been found that the pigments obtained by coating dry-milled platelet-shaped inorganic substrates with one or more layers each of which contains one or more sparingly soluble, strongly adhering inorganic or organic colorants are distinguished by advantageous properties and in particular by high color intensity, high color cleanness and high hiding power and by good processability and good skin feeling.

The colorants which can be used for coating include a wide range of colorants, such as, for example, metal chalcogenides or metal chalcogenide hydrates, color lakes, complex salt pigments, carbon black particles and/or organic colorants.

For coating, it is particularly preferred to apply colored or colorless metal oxides/hydroxides or metal oxide hydrates, such as, for example, titanium oxide, tin oxide, zinc oxide, zirconium oxide, iron oxide, yellow FeO(OH) in the goethite form, chromium oxide, cobalt oxide, copper dioxide, nickel oxide, manganese oxide, silicon dioxide or other metal oxides alone or in a mixture to the dry-milled substrates, it being possible to deposit one or more successive layers. The metal oxides listed are merely given by way of example and are intended to illustrate the invention without limiting it. If a metal forms a plurality of oxides, such as, for example, iron oxide (such as $Fe_2O_3$, $Fe_3O_4$, and mixed oxides, such as $TiO_2\times Fe_2O_3$), these oxides can in general be applied selectively by choosing suitable deposition conditions. With some metals, it is also possible to obtain stable, suboxide layers which are in general non-stoichiometric, such as, for example, titanium suboxide or titanium oxynitride, by reducing the metal oxide layers.

The metal oxide layers are preferably applied by wet chemical methods, for which the wet chemical coating methods developed for preparing pearl luster pigments can be used; such methods are described, for example, in DE 1,467,468, DE 1,959,988, DE 2,009,566, DE 2,214,545, DE 2,215,191, DE 2,244,298, DE 2,313,331, DE 2,522,572, DE 3,137,808, DE 3,137,809, DE 3,151,343, DE 3,151,354, DE 3,151,355, DE 3,211,602, DE 3,235,017 and also in further patent documents and other publications.

In wet coating, the dry-milled particles are preferably suspended in water, and one or more hydrolyzable metal salts are added at a pH suitable for hydrolysis which is selected in such a manner that the meal oxides or hydrated metal oxides are directly deposited on the particles without any secondary precipitations taking place. The pH is usually kept constant by simultaneous metered addition of a base.

The pigments are then separated off, washed and dried and, if desired, calcined, it being possible for the calcining temperature to be optimized with regard to the coating present in the particular case. In the case of multilayer pigments, application of the individual coatings can be followed, if desired, by separating off the pigments, drying and if required, calcining them and then resuspending them in order to deposit the further layers by precipitation.

Furthers the coating of the dry-milled particles with metal oxides/hydrated metal oxides can also take place by gas-phase coating in, for example, a fluidized-bed reactor, for which the methods proposed, for example, in EP 0,045,851 and EP 0,106,235 for preparing pearl luster pigments can be applied accordingly.

Particular preference is given to particles coated with titanium dioxide and/or iron oxide which are obtained by dry-milling of natural or synthetic mica, in particular of natural mica and very particularly of muscovite. These pigments preferably exhibit one or two and, in particular, one coating.

Preference is further given to particles coated with yellow FeO(OH) in the goethite form. These yellow pigments are preferably prepared by wet-chemical precipitation of iron (II) salts, such as $FeCl_2$, $FeSO_4$, at elevated temperature and under oxygen supply at suitable pH conditions.

The weight proportion of the metal oxide coating, relative to the substrate, is 5 to 350%, preferably 10 to 300%.

The dry-milled substrate materials can preferably also be coated with color lakes and, in particular, with Al color lakes. To this end, first an aluminum hydroxide layer is usually precipitated onto the substrate particles, this layer then being laked with a dye in a second step. A preferred method for applying an Al color lake is described, for example, in DE 2,429,762, preference also being given to the color lakes listed there. A modified, likewise preferred method is described in DE 2,928,287. A very particularly preferred Al color lake is carmine.

Furthermore, the dry-milled substrate materials can preferably also be coated with complex salt pigments and particularly preferably with cyanoferrate complexes; very particular preference is given to coatings containing Prussian Blue and/or Tumbull's Blue. To this end, a cyanoferrate solution and an iron salt solution are usually added to the aqueous suspension of the dry-milled substrate material, followed, if desired, by oxidation, such as described, for example, in EP 0,141,173 or DE 2,313,332 for conventional pearl luster pigments.

Furthermore, it is preferred to coat the dry-milled substrate materials with organic dyes and, in particular, with phthalocyanine or metal phthalocyanine and/or indanthrene dyes. To this end, a suspension of the dry-milled substrate in a solution of the dye is usually prepared, and this suspension is then combined with a solvent in which the dye is sparingly soluble or insoluble, as described, for example in DE 4,009,567, for conventional pearl luster pigments.

It is also possible to use other dyes and pigments, for example benzoquinone, nitro, nitroso, azo, triarymethane, xanthene, quinoline, cyanine, methine, oxazine, anthraquinone or indigo types.

The coatings described are only given by way of example and are merely intended for illustrating the present invention without limiting it. The dry-milled substrate materials can also be coated with other colorants.

The pigments according to the invention are characterized by high color intensity, color cleanness and high hiding power. Since unlike traditional absorption pigments they have improved skin feeling and advantageous oil absorption values, they are preferably used in aqueous or non-aqueous cosmetic formulations and also in cosmetic solid preparations, such as powders and the like.

In addition, the pigments according to the invention possess good dispersibility and redispersibility and are therefore preferably used in aqueous or non-aqueous coating systems from the printing and paints and coatings sectors. Pigment preparations of this type are particularly preferably also used for printing food packagings and textiles. The pigments of the invention are further notable for exceedingly good reproducibility of their hues, which is frequently not the case with conventional formulations.

Furthermore, the pigments according to the invention are also highly suitable for pigmenting plastics.

The pigment preparations according to the invention can be used for a variety of applications and they are of great economic importance.

Without further elaboration, it is believed that one skilled in the art can, using the preceding description, utilize the present invention to its fullest extent, The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The examples which follow are intended to illustrate the invention without limiting it.

EXAMPLES

Example 1 a) Preparation of Dry-Milled Mica 250 kg of naturally occurring mica (platelet diameter of up to about 2 cm) are dry-milled in an industrial stirred ball mill (about 4 tons of corundum grinding medium; diameter of the grinding medium about 5 mm) at a maximum power input of about 200 kW.

The mill base is then classified on an air separator to give the following fractions:

|  | $d_{95}/\mu m$ | $d_{50}/\mu m$ |
| --- | --- | --- |
| Fraction I | 24 | 8 |
| Fraction II | 12 | 4.5 |

$d_{95}$ and $d_{50}$ are the diameter values under which 95 and 50%, respectively, of the milled particles remain.

b) Coating with $Fe_2O_3$ 100 g of dry-milled mica of fraction I are suspended in 2 l of fully deionized water, and the suspension is heated to 75° C. with stirring. The pH is brought to 4.0 with 32% HCl, and an aqueous $FeCl_3$ solution (270.82 g of $FeCl_3 \times 6H_2O$ in 1500 ml of fully deionized water) is metered in at a rate of 4 ml/min while maintaining the pH constant by metered addition of 32% NaOH.

After the additions stirring of the suspension with the heating turned off is continued for another 15 minutes. The product is then filtered off with suction and washed with 30 l of fully deoinized water until it is free of chloride. The pigment is then dried at 110° C. for 8 h and calcined at 850° C. for 1 h to give a red pigment having high hiding power and high color intensity and containing 40% of $Fe_2O_3$.

Example 2 a) Preparation of Dry-Milled Mica

Preparation takes place by the procedure given in Example 1a).

b) Coating with Prussian Blue 100 g of dry-milled mica of fraction I are suspended in 2 l of fully deionized water, and the suspension is heated to 75° C. with stirring. The pH is brought to 4.0 with 32% HCl, and an aqueous $K_4[Fe(CN)_6]$, solution (36.46 g of $K_4[Fe(CN)_6]\times 3H_2O$ in 375 ml of fully deionized water) and an aqueous $FeCl_3/NH_4Cl$ solution (31.06 g of $FeCl_3\times 6H_2O$, 11.6 g of $NH_4Cl$ in fully deionized water acidified with 10 ml of 32% HCl, total volume 375 ml) are then added simultaneously but separately at a rate of 0.3 ml/min. After every 15 minutes, the metering rate is raised to 0.7 ml/min and then to 1.3 ml/min and 2.0 ml/min, and coating is performed at this value until both solutions are consumed. The pH is kept constant with 10% $(NH_4)_2CO_3$ solution.

After the addition, stirring of the suspension is continued for 15 minutes with the heating turned off. The product is then filtered off with suction and washed with 15 l of fully deionized water until it is free of chloride. The pigment is then dried at 110° C. for 8 h to give a blue pigment having high hiding power and high color intensity and containing 20% of Prussian Blue.

Example 3 a) Preparation of Dry-Milled Silica

Preparation takes place by the procedure given in Example 1a).

b) Coating with Tumbull's Blue 100 g of dry-milled mica of faction I are suspended in 2 l of fully deionized water, and the suspension is heated to 75° C. with stirring. The pH is brought to 4.0 with 20% $H_2SO_4$, and an aqueous $K_4[Fe(CN)_6]$ solution (109.88 g of $K_4[Fe(CN)_6]\times 3H_2O$ in 1500 ml of fully deionized water) and an aqueous $FeSO_4$ solution (139.16 g of $FeSO_4$, 46.4 g of $NH_4Cl$ in fully deionized water acidified with 80 ml of 20% $H_2SO_4$, total volume 1500 ml) are then added simultaneously but separately at a rate of 0.3 ml/min. After every 15 minutes, the metering rate is raised to 0.7 ml/min and then to 1.3 ml/min and 20 ml/min, and coating is performed at this value until both solutions are consumed. The pH is kept constant with 10% $(NH_4)_2CO_3$ solution.

After the addition, stirring of the suspension is continued for 15 minutes with the heating turned off. The product is then filtered off with suction and washed with 45 l of fully deionized water until it is free of chloride. The pigment is then dried at 110° C. for 8 h to give a blue pigment having high hiding power and high color intensity and containing 50% of Turnbull's Blue.

Example 4 a) Preparation of Dry-Milled Mica

Preparation takes place by the procedure given in Example 1a).

b) Coating with $Fe_3O_4$ 100 g of dry-milled mica of fraction I are suspended in 2 l of fully deionized water, and the suspension is heated to 75° C. with stirring. The pH is brought to 8.0 with 32% NaOH, and the suspension is flushed with nitrogen (130 l/h). An aqueous $FeSO_4$ solution (720.4 g of $FeSO_4\times 7H_2O$ and 119.4 g of $KNO_3$ in fully deionized water acidified with 40 ml of 20% $H_2SO_4$, total volume 2000 ml) is then added at a rate of 2 ml/min over a period of 1 h and the remainder is then added at the rate of 4 ml/min. The pH is kept constant by the metered addition of 10% NaOH solution.

After the addition, stirring of the suspension is continued for 30 minutes with the heating turned off. The product is then filtered off with suction and washed with 45 l of fully deionized water until it is free of sulfate. The pigment is then dried at 100° C. for 8 h to give a black pigment having high hiding power and high color intensity and containing 67% of $Fe_3O_4$.

Example 5

100 g of dry-milled mica of fraction I (Example 1a) are suspended in 2 l of water and heated to 75° C. with stirring. On attainment of the temperature 10% hydrochloric acid is added to adjust the pH to 2.2. 594 ml of $TiCl_4$ solution (400 g of $TiCl_4$/l of $H_2O$) are metered into the mica suspension while the pH is kept constant with 32% sodium hydroxide solution. On completion of the coating the batch is stirred for 0.5 h and then adjusted with 32% sodium hydroxide solution to pH 7.0. Then an aqueous $ZnCl_2$ solution (9.31 g of $ZnCl_2$ in 11 ml of HCl at 330 ml of $H_2O$) is added to the suspension over 0.5 h. The batch is subsequently stirred at room temperature for 0.5 h and washed chloride-free with water, and the pigments are dried at 110° C. for 8 h. Finally the pigments are calcined at 700° C. for 1 h and sieved to 100 μm.

The product obtained is a white pigment of high cleanness.

Example 6

50 g of dry-milled mica of fraction I (Example 1a) are suspended in 1 l of water and admixed at 75° C. at pH 2.2 with 30% $TiCl_4$ solution over 15 min by stirring. During the coating step the pH is kept constant with 32% sodium hydroxide solution. The product is washed chloride-free with 10 l of water and suspended in 500 ml of water. To this pigment suspension are added dropwise in a nitrogen atmosphere at 70° C. an aqueous $FeSO_4$ solution (50 g of $FeSO_4\times 7H_2O$ in 500 ml of water, adjusted to pH 1.5 with 20% $H_2SO_4$). Then 10% $Na_2CO_3$ solution is used to adjust the pH to 4, and oxygen is introduced at a rate of 5 l/h. During the reaction the pH is kept constant at pH 4 with 10% $Na_2CO_3$ solution. The reaction ends after 6 h. The batch is subsequently stirred for 0.5 h and washed sulfate-free with water, and the product is dried at 110° C. and sieved to 100 μm.

The product obtained is a yellow pigment of high cleanness of hue and good skin feeling.

Comparative Example 1

Following the method of Examples 1b), 2b) and 4b), wet-milled M mica (95% of the mica particles having a diameter between 1 and 15 μm) was coated with $Fe_2O_3$, Prussian Blue and $Fe_3O_4$.

The pigments thus obtained and the pigments according to Examples 1b), 2b) and 4b) were used to produce paint film specimens whose coloristic measurement under the luster condition (geometry 20°/22.5°, DIN 5033, Hunter LAB) gave the following brightness values:

| Substrate | L values | | |
| --- | --- | --- | --- |
| | $Fe_2O_3$ | Coating Prussian blue | $Fe_3O_4$ |
| Dry-milled mica | 33.90 | 25.92 | 27.63 |
| Mica having a particle size of <15 μm | 72.86 | 31.20 | 32.40 |

The preceding examples can be repeated with similar success by substituting the generically or specifically described reactants and/or operating conditions of this invention for those used in the preceding examples.

From the foregoing discussion, one skilled in the art can easily ascertain the essential characteristics of this invention and, without departing from the spirit and scope thereof, can make various changes and modifications of the invention to adapt it to various usages and conditions.

In a second embodiment, the present invention relates to non-lustrous iron oxide-containing color pigments based on dry-milled inorganic plateletlike (i.e., platelet-shaped) substrates having a particle size of <60 μm, which pigments are notable for the fact that the iron oxide coating is of yellow FeO(OH) and/or $Fe_2O_3$.

Conventional absorption pigments, of which iron oxides are an example, are normally composed of very small particles having an average particle size which is typically 0.1–1 μm, which absorb specific wavelengths or wavelength ranges of the incident light and reflect the remaining light, essentially in a diffuse manner, and thus produce the complementary color of the light absorbed. Such pigments generally have a rough, irregular surface and are more or less opaque. The optical properties are influenced by the average size of the pigment particles, with the cleanness and depth of color increasing as the average particle size falls. Particularly advantageous properties are possessed by pigment particles having an average diameter of less than 1 μm. However, ultrafine pigment particles of this kind are generally noted for poor dispersibility, which increases as the particle size falls.

Among the absorption pigments, iron oxide pigments have a particularly high degree of economic importance, which they owe above all to their weather resistance, light fastness and the broad color range, which extends from yellow via red and brown to black. Colored, plateletlike pigments containing iron oxide are described in numerous references in the literature. These references relate in particular to the application of $Fe_2O_3$ layers, optionally with other metal oxides such as, for example, $TiO_2$, to a plateletlike inorganic substrate, such as mica. Such pigments are disclosed in DE 23 13 331. DE 41 37 764 claims iron oxide pigments based on $SiO_2$, $TiO_2$ or $ZrO_2$ platelets. In Cosmetics & Toiletries, Vol. 107, No. 4, p. 53 ff., transparent iron oxide-containing pigments are described which are obtained by coating mica with FeO(OH) or $Fe_2O_3$.

Pigments containing iron oxide which are based on plateletlike substrates, the so-called pearl luster pigments, have a smooth surface and a relatively large particle diameter, typically 15–100 μm, which give them optical properties which are different from those of the absorption pigments. Pearl luster pigments are distinguished by a high gloss and a low hiding power—properties which must be traced back to the transparent or semitransparent substrate material. However, for many applications, high-hiding color pigments without luster are required, for example in cosmetic formulations such as face powders.

An object was therefore to discover lusterless color pigments which, in addition to the mass-tone color, have a high hiding power, are readily dispersible and possess none of the above-mentioned disadvantages.

It has now surprisingly been found that non-lustrous iron oxide-containing pigments of high color strength are obtained when dry-milled inorganic plateletlike (i.e., platelet-shaped) substrates having a particle size of preferably <60 μm are coated with yellow FeO(OH) and/or $Fe_2O_3$.

In terms of color strength, hue, luster and hiding power, the color pigments of the invention are very different from the iron oxide-containing pearl luster pigments. This clearly shows that it is not the chemical composition of the coating alone which is responsible for the properties of the pigment, but that a whole range of other factors have a role to play, these factors including, in particular, the structure and the characteristics of the basic substrate, and also the coating process. The use of a lusterless basic substrate of irregular particle morphology in combination with FeO(OH) or $Fe_2O_3$ coverings on the substrate surface gives color pigments which, as a result of the irregular surface shape and of the absorption of light, exhibit only one color and no luster.

The invention therefore relates to non-lustrous (e.g., non-pearlescent or "non-nacreous") iron oxide-containing color pigments based on dry-milled inorganic plateletlike substrates having a particle size of <60 μm, whose distinguishing feature is that the iron oxide compound is yellow FeO(OH) and/or $Fe_2O_3$. Typical dry-milling techniques are disclosed in DE 43 40 146 and U.S. patent application Ser. No. 08/346,242, now abandoned. However, any technique which produces particles which are 2-dimensional in long range order, but not platelet-shaped, is suitable.

The invention also relates to a process for the preparation of the pigments of the invention, which is notable in that an aqueous suspension of the dry-milled inorganic plateletlike substrate is used as initial charge, an aqueous iron(II) salt solution is added with stirring at temperatures of 5–40° C. and at a pH of 6–9, and air and/or pure oxygen is passed through the reaction solution, after which the coated pigment is isolated, washed, dried and, if desired, calcined at temperatures of 400–1000° C.

A constituent of the color pigment according to the invention is the basic substrate. Suitable plateletlike inorganic substrates are all phyllosilicates, such as, for example, mica, talc, kaolin or sericite, but also synthetic mica. It is preferred to employ mica, for example muscovite or phlogopite. The substrates generally employed have a particle size of <60 μm, preferably <25 μm and in particular <15 μm. The starting materials used as substrates are known and can be obtained by dry milling of the plateletlike substrates followed by classification into the desired order of size. The dry-milled phyllosilicates have very largely lost their original platelet form. Thus, for example, the dry milling of muscovite mica in a ball mill results in a white lusterless powder which is composed essentially of irregularly formed particles devoid of platelet structure, i.e., non-plateletshaped.

The process according to the invention is simple and easy to manage. Coating is carried out by a wet-chemical method, in which the dry-milled phyllosilicates are first of all suspended in water. Then an iron(II) salt is added, for example ammonium iron(II) sulfate, iron(II) halide or, in particular, iron(II) sulfate, at temperatures in the range from 5 to 40° C., preferably 10–30° C., while maintaining the pH of the reaction mixture within a range which brings about hydrolysis of the metal salt. This is most expediently accomplished by the simultaneous addition of a base such as, for example, NaOH, KOH, $Na_2CO_3$ or ammonia. However, it is also possible to use a suitable buffer system. The pH should preferably be above 6, especially 6–9.

During and/or after the addition of the iron(II) salt, preferably as an aqueous iron(II) salt solution, air and/or pure oxygen is passed through the reaction solution as an oxidizing agent, the iron oxide being deposited on the substrate as iron oxide hydrate in such a way that there are no instances of secondary precipitation in the suspension.

The finished color pigment is finally isolated from the reaction mixture, washed with water and in general dried at temperatures of 80–120° C. A yellow pigment is obtained which changes color to orange on dehydration at temperatures of 400–1000° C. owing to the transformation of FeO(OH) into $Fe_2O_3$.

Depending on the desired color strength, the thickness of this iron oxide-containing layer may be up to about 300 nm, preferably 10–80 nm. The color pigments according to the invention can contain up to about 80% by weight, e.g., 5 to 70% by weight, preferably up to 50% by weight, of FeO (OH) or $Fe_2O_3$, based on the total coated pigment.

In accordance with the process of the invention it is possible to color all known substrates, both milled platelet-like and optionally milled non-plateletlike substrates having a particle size of 1–150 μm, preferable 1–60 μm and, in particular, 1–25 μm, with a FeO(OH) or $Fe_2O_3$ layer.

Particularly suitable substrates for the process are phyllosilicates, for example talc, kaolin, sericite or mica, plateletlike bismuth oxychloride, barium sulfate, synthetic mica, metallic pigments such as plateletlike iron oxide, aluminum flakes, for example Standard from Eckert, special-effect pigments, for example Paliochrom® from BASF, and pearl luster pigments—metal oxide coated mica flake pigments—from E. Merck, Darmstadt, bearing the trade name Iriodin®. The latter are known, for example, from the German Patents and Patent Applications 14 67 468, 19 59 998, 20 09 566, 22 14 545, 22 15 191, 22 44 298, 23 13 331, 25 22 272, 31 37 808, 31 37 809, 31 51 343, 31 51 354, 31 51 355, 32 11 602 and 32 35 017. Particular preference is given to the use of mica pigments coated with $TiO_2$ and/or with $Fe_2O_3$, and to synthetic, unsupported platelets, ceramic flakes, glass flakes or $SiO_2$ flakes which are uncoated or coated with one or more metal oxides.

In some cases it is expedient in addition to provide the color pigments of the invention with a covering layer. For this purpose it is expedient to choose, in a known manner, layers of colorless oxides, such as $TiO_2$, $ZrO_2$, $Al_2O_3$, $SbO_2$, ZnO, $SiO_2$, MgO, CaO, $Ce_2O_3$ or $SnO_2$, each of which may be applied alone or as a mixture. In order to hydrophobicise the surface to adapt it to specific application systems, it is advisable to treat the color pigments of the invention with a silane or with surface-active auxiliaries such as, for example, magnesium stearate. A covering layer of this kind can be applied to ready-dried pigments by conventional methods or, alternatively and even more simply, can be applied prior to the isolation of the pigments from the precipitation solution. The covering layer is generally thinner than the layer of iron oxide and/or iron oxide hydrate.

The lusterless color pigments according to the invention are distinguished on the one hand by high color intensity and high hiding power and on the other hand by an extremely high reproducibility of shade, which is frequently not the case with conventional absorption pigments. In addition, they exhibit advantageous colors in industrially relevant systems. Furthermore, they are distinguished by a very good feeling on the skin and by advantageous oil absorption values. As a result of these properties, the pigments are particularly suitable for aqueous and nonaqueous cosmetic formulations, but also for solid cosmetic preparations such as, for example, face powders, ointments, emulsions, lip salves and other compositions, and can be employed in concentrations of, in general, from 0.01 to 100% by weight. In addition to this, the color pigments display good dispersibility and redispersibility and are therefore preferably employed in aqueous or nonaqueous coating systems from the sectors of coatings, paints and printing inks. In addition, the pigments according to the invention are suitable for the pigmentation of plastics.

The invention therefore also relates to formulations which comprise the color pigments according to the invention.

Plastics which comprise the pigments of the invention are, in addition, suitable for laser marking. The addition of the color pigments in concentrations of from 0.01 to 20% by weight, preferably from 0.5 to 15% by weight and, in particular, from 0.8 to 5% by weight, based on the plastics system, gives high-contrast and high-definition laser markings which are resistant to wiping and scratching. This pigmented plastic can be used in all sectors in which conventional printing techniques have previously been employed for the marking of plastics.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding German Applications No. P 44 40 146.5, filed Nov. 25, 1993 and P 44 45 394.9, filed Dec. 21, 1994, are hereby incorporated by reference.

ADDITIONAL EXAMPLES

Example 1-A 100 g of dry-milled mica having a particle size of $\leq 12$ μm are suspended in 2 l of water. The pH is adjusted to 7.5 with 10% hydrochloric acid. An aqueous solution of $FeSO_4$ (120 g of $FeSO_4 \cdot 7H_2O$ in 420 ml of water) is added dropwise to this pigment suspension at 20° C. At the same time, oxygen is passed through the suspension at a rate of 30 l/min. During the reaction, the pH is kept constant at 7–8 using 10% $Na_2CO_3$ solution. After the addition of the $FeSO_4$ solution is complete, stirring is continued for 15 minutes. Finally, the product is washed with water until free from sulfate, dried at 110° C. and screened to 100 μm. The finished pigment contains 25.6% by weight of FeO(OH) and is distinguished by its intense yellow-orange color.

Example 2-A

The product of Example 1 is calcined at 850° C. for 0.5 h. An orange pigment with great cleanness of color is obtained.

Comparison Example 1-A

The dry-milled mica used in Example 1 is replaced by plateletlike mica having a particle size of <15 μm. Coating with FeO(OH) is carried out as in Example 1.

Comparison Example 2-A

The product of Comparison Example 1 is calcined at 850° C. for 0.5 h.

Assessment of Color Properties

The yellow and orange pigments obtained from the Examples and the Comparison Examples are incorporated into a coating base (nitrocellulose lacquer) and applied to metal panels. The color and luster characteristics are measured by the Lab method (DIN 5033 Hunter-LAB). The reflected light (gloss) from different measurement geometries—22.5°/22.5° and 45°/0°—is determined from the luminance values (L values) of the coated cards, in accordance with the following formula:

$$\text{luster number} = \frac{L_{22.5°/22.5°} - L_{45°/10°}}{L_{22.5°/22.5°}} \times 100$$

| Product | Luster Number |
| --- | --- |
| Example 1 | 30.6 |
| Comparison Example 1 | 50.6 |
| Example 2 | 34.4 |
| Comparison Example 2 | 42.8 |

It is evident from the table that the products obtained from Examples 1 and 2 based on dry-milled mica have substantially lower luster than pigments based on plateletlike mica.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A non-lustrous iron oxide-containing color pigment, comprising a dry-milled inorganic platelet-shaped substrate and a layer of at least one of yellow FeO(OH) or orange $Fe_2O_3$.

2. A color pigment according to claim 1, wherein the substrate has a particle size of <60 µm.

3. A color pigment according to claim 2, wherein the layer is $Fe_2O_3$ prepared by dehydrating FeO(OH) at a temperature of 400–1000° C.

4. A color pigment according to claim 2, wherein the content of iron oxide or iron hydroxide is from 5 to 70% by weight, based on the overall pigment.

5. A color pigment according to claim 2, wherein the inorganic platelet-shaped substrate is mica.

6. A color pigment according to claim 2, additionally containing a covering layer comprising at least one colorless metal oxide, a silane compound or a stearate, or a mixture thereof.

7. A non-lustrous iron oxide-containing color pigment, comprising a non-platelet-shaped substrate two-dimensional in long range order and a layer of at least one of yellow FeO(OH) or orange $Fe_2O_3$.

8. A color pigment according to claim 7, wherein the substrate has an irregular shape.

9. A color pigment according to claim 7, wherein the substrate is produced from a platelet-shaped substrate.

10. A color pigment according to claim 9, wherein the substrate is obtained by dry-milling the platelet-shaped substrate.

11. In a coating, ink, plastic or cosmetic formulation, comprising a color pigment, the improvement wherein the color pigment is according to claim 1.

12. In a coating, ink, plastic or cosmetic formulation, comprising a color pigment, the improvement wherein the color pigment is according to claim 2.

13. In a laser-markable plastic, comprising a color pigment, the improvement wherein the color pigment is one according to claim 1.

14. In a laser-markable plastic, comprising a color pigment, the improvement wherein the color pigment is one according to claim 2.

15. In a coating, ink, plastic or cosmetic formulation, comprising a color pigment, the improvement wherein the color pigment is according to claim 7.

16. In a laser-markable plastic, comprising a color pigment, the improvement wherein the color pigment is one according to claim 7.

17. A color pigment according to claim 2, wherein the content of iron oxide or iron hydroxide is from up to 80% by weight, based on the overall pigment.

18. A non-glossy pigment of high color intensity and high hiding power, which pigment is obtained by dry-milling at least one platelet-shaped inorganic substrate, classifying the thus-milled substrate and applying thereto one or more layers comprising one or more sparingly soluble, strongly adhering inorganic or organic colorants.

19. The pigment of claim 18, wherein the classification is carried out to give a $d_{95}$ cut of less than 50 µm.

20. The pigment of claim 18, wherein at least one platelet-shaped inorganic substrate is mica or another sheet silicate material.

21. The pigment of claim 18, wherein at least one colorant is a metal chalcogenide, metal chalcogenide hydrate, color lake, complex salt pigment, carbon black particle or organic dye.

22. The pigment of claim 18, wherein at least one colorant is a metal oxide/hydrated metal oxide, aluminum color lake, cyanoferrate complex, phthalocyanine or metal phthalocyanine dye or indanthrene dye.

23. The pigment of claim 22, wherein at least one colorant is titanium dioxide or an iron oxide.

24. A printing, paint, coating, cosmetic or plastics formulation comprising a pigment according to claim 18.

25. The pigment of claim 18, wherein one or more layers of colorants are applied by precipitation onto the substrate by a wet chemical method or by chemical vapor deposition in a fluidized bed reactor.

26. The pigment of claim 18, wherein the process further comprises washing, drying and optionally calcining the substrate with one or more layers of colorants thereon.

27. The pigment of claim 18, wherein the substrate after dry milling is not platelet-shaped but exhibits a degree of two dimensional long range order.

28. A process for preparing a pigment which comprises dry milling at least one platelet-shaped inorganic substrate and applying thereto one or more layers comprising a colorant.

29. A process for preparing a non-glossy pigment of high color intensity and high hiding power which comprises dry milling at least one platelet-shaped inorganic substrate, classifying the thus-milled substrate and applying thereto one or more layers comprising one or more sparingly soluble, strongly adhering inorganic or organic colorants.

* * * * *